(12) United States Patent
Hosotani

(10) Patent No.: US 9,106,141 B2
(45) Date of Patent: Aug. 11, 2015

(54) SWITCHING POWER SUPPLY DEVICE

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 215 days.

(21) Appl. No.: 13/941,753

(22) Filed: Jul. 15, 2013

(65) Prior Publication Data

US 2013/0301308 A1 Nov. 14, 2013

Related U.S. Application Data

(63) Continuation of application No. PCT/JP2011/078244, filed on Dec. 7, 2011.

(30) Foreign Application Priority Data

Jan. 26, 2011 (JP) ................................ 2011-014612

(51) Int. Cl.
*H02M 3/335* (2006.01)
*H02M 3/338* (2006.01)
*H02M 1/00* (2007.01)

(52) U.S. Cl.
CPC ........ *H02M 3/33507* (2013.01); *H02M 3/3381* (2013.01); *H02M 3/33576* (2013.01); *H02M 2001/0058* (2013.01); *Y02B 70/1433* (2013.01); *Y02B 70/1491* (2013.01)

(58) Field of Classification Search
USPC ......... 363/15–16, 21.01, 21.02, 21.04, 21.06, 363/21.12, 21.14
See application file for complete search history.

(56) References Cited

U.S. PATENT DOCUMENTS

| | | | |
|---|---|---|---|
| 5,438,497 A | * | 8/1995 | Jain .................................. 363/17 |
| 6,301,128 B1 | | 10/2001 | Jang et al. |
| 6,934,167 B2 | * | 8/2005 | Jang et al. .................. 363/21.02 |

(Continued)

FOREIGN PATENT DOCUMENTS

| | | |
|---|---|---|
| CN | 1705217 A | 12/2005 |
| CN | 101785073 A | 7/2010 |

(Continued)

OTHER PUBLICATIONS

Official Communication issued in International Patent Application No. PCT/JP2011/078244, mailed on Mar. 13, 2012.

(Continued)

*Primary Examiner* — Jeffrey Gblende
(74) *Attorney, Agent, or Firm* — Keating & Bennett, LLP

(57) ABSTRACT

In a switching power supply device with reduced size and increased power conversion efficiency, a first resonant circuit including a series resonant inductor and a series resonant capacitor, and a second resonant circuit including a series resonant inductor and a series resonant capacitor, are caused to resonate with each other to cause sympathetic vibration of each resonant circuit, such that transmission is performed by utilizing both magnetic field coupling and electric field coupling between a primary winding and a secondary winding. Operation at a switching frequency higher than a specific resonant frequency of an overall multi-resonant circuit allows a ZVS operation to be performed, enabling a significant reduction in switching loss and high-efficiency operation.

20 Claims, 8 Drawing Sheets

(56) References Cited

U.S. PATENT DOCUMENTS

| | | | |
|---|---|---|---|
| 7,579,715 B2 * | 8/2009 | Seelig et al. | 307/75 |
| 7,629,781 B2 * | 12/2009 | Kyono | 323/267 |
| 2005/0270805 A1 | 12/2005 | Yasumura | |
| 2006/0077600 A1 | 4/2006 | Yasumura | |
| 2007/0008744 A1 | 1/2007 | Heo et al. | |
| 2012/0032633 A1 | 2/2012 | Cordes et al. | |
| 2012/0281436 A1 * | 11/2012 | Cuk | 363/21.03 |

FOREIGN PATENT DOCUMENTS

| | | |
|---|---|---|
| CN | 102064702 A | 5/2011 |
| JP | 56-162972 A | 12/1981 |
| JP | 06-046561 A | 2/1994 |
| JP | 07-322613 A | 12/1995 |
| JP | 09-308243 A | 11/1997 |
| JP | 11-067551 | 3/1999 |
| JP | 2006-050689 A | 2/2006 |
| JP | 2006-074897 A | 3/2006 |
| JP | 2006-101651 A | 4/2006 |
| JP | 2006-115679 A | 4/2006 |
| JP | 2007-020391 A | 1/2007 |
| WO | 2010/115867 A1 | 10/2010 |

OTHER PUBLICATIONS

Hosotani et al., "A Novel Multi-Resonant Current Zvs Converter Operated in Fixed Frequency", IEICE Technical Report, 6 pages, Jan. 27, 2011.

Official Communication issued in corresponding Chinese Patent Application No. 201180066145.6, mailed on Feb. 2, 2015.

Jianbing, L. et al., "Analysis of Parasitic Parameters of Planar Transformer", The Eleventh Academic Annual Meeting of Power Electronics Committee of Chinese Electrotechnical Society, pp. 1-25.

* cited by examiner

SWITCHING POWER SUPPLY DEVICE

BACKGROUND OF THE INVENTION

1. Field of the Invention

The present invention relates to a switching power supply device that includes a switching element on a primary side and a rectifier circuit on a secondary side and that performs power transmission by using the electromagnetic field resonance phenomenon.

2. Description of the Related Art

With recent progress toward compact and lightweight electronic devices, market demand for high-efficiency, compact, and lightweight switching power supplies has increasingly grown. For example, current resonant half-bridge converters that cause a transformer to operate in response to a sinusoidal resonant current flowing therethrough by using an LC resonance phenomenon have been increasingly put into practical use in markets of goods such as flat-screen televisions with comparatively moderated output current ripple characteristics, while taking advantage of the feature of high efficiency.

For example, an LC series resonant DC-DC converter is disclosed in Japanese Unexamined Patent Application Publication No. 9-308243. FIG. 1 is a basic circuit diagram of a switching power supply device in Japanese Unexamined Patent Application Publication No. 9-308243. The disclosed switching power supply device is a current resonant type half-bridge DC/DC converter, and an LC resonant circuit composed of an inductor Lr and a capacitor Cr and two switching elements Q1 and Q2 are connected to a primary winding np of a transformer T. A rectifying and smoothing circuit composed of diodes Ds1 and Ds2 and a capacitor Co is constructed at secondary windings ns1 and ns2 of the transformer T.

With the configuration described above, the switching elements Q1 and Q2 are alternately turned on and off with a dead time, and the current waveform flowing through the transformer T is a sinusoidal resonant waveform. Further, power is transmitted from the primary side to the secondary side during both on periods and off periods of the two switching elements Q1 and Q2.

However, in the switching power supply device of Japanese Unexamined Patent Application Publication No. 9-308243, the transformer is used as an insulating transformer that utilizes electromagnetic induction, and is merely utilized as a transformer that utilizes magnetic coupling. In a transformer that utilizes electromagnetic induction, the magnetic flux generated by a current flowing through the primary winding is linked to the secondary winding to cause a current to flow through the secondary winding, and efficient conversion from electricity to magnetism and further to electricity is important. In general, the proportion of the magnetic fluxes linked to the secondary winding in the magnetic fluxes generated by the current flowing through the primary winding is called the degree of (magnetic) coupling. In a transformer that utilizes electromagnetic induction, it is important to increase the degree of magnetic coupling in order to increase power conversion efficiency. However, the degree of magnetic coupling of the transformer may be difficult to increase because magnetic saturation is prevented or because of physical constraints, resulting in power conversion efficiency being reduced.

In the switching power supply device of Japanese Unexamined Patent Application Publication No. 9-308243, furthermore, since frequency control and PFM (Pulse Frequency Modulation) control are used for control of its output, it is necessary to design a smoothing circuit in accordance with the minimum operating frequency, which hinders compactness. In addition, in view of operation on the order of MHz for miniaturization of magnetic components, changes in operating frequency result in a significant problem in terms of the controllability of output, EMC (electromagnetic compatibility), and so forth.

SUMMARY OF THE INVENTION

Preferred embodiments of the present invention provide a switching power supply device with reduced size and increased power conversion efficiency.

According to a preferred embodiment of the present invention, a switching power supply device includes an electromagnetic field coupling circuit including a primary winding and a secondary winding; a primary-side alternating-current voltage generating circuit including switching circuits connected to the primary winding, each of the switching circuits including a parallel connection circuit which includes a switching element, a diode, and a capacitor, the primary-side alternating-current voltage generating circuit generating an alternating-current voltage from an input direct-current voltage; a secondary-side rectifier circuit that rectifies the alternating-current voltage into a direct-current voltage; a first resonant circuit on a primary side, the first resonant circuit including a first series resonant inductor and a first series resonant capacitor; a second resonant circuit on a secondary side, the second resonant circuit including a second series resonant inductor and a second series resonant capacitor; and a switching control circuit that alternately turns on and off the switching elements of the primary-side alternating-current voltage generating circuit with a dead time to generate an alternating-current voltage having a substantially square or trapezoidal wave shape, wherein the switching control circuit causes the switching elements of the primary-side alternating-current voltage generating circuit to perform a switching operation at a switching frequency higher than a specific resonant frequency at which impedance for a multi-resonant circuit becomes minimum, the multi-resonant circuit being a combination of the first resonant circuit and the second resonant circuit which includes the electromagnetic field coupling circuit, so that a current flowing into the multi-resonant circuit has a sinusoidal resonant current waveform that is delayed from the alternating-current voltage generated from the primary-side alternating-current voltage generating circuit and power is transmitted from the primary side to the secondary side through the electromagnetic field coupling circuit in both on periods and off periods of the switching elements, the electromagnetic field coupling circuit defines an electromagnetic field resonant circuit in which magnetic field coupling through mutual inductance and electric field coupling through mutual capacitance are mixed between the primary winding and the secondary winding, and the first resonant circuit and the second resonant circuit resonate with each other to allow power to be transmitted from the primary side to the secondary side of the electromagnetic field coupling circuit.

The switching control circuit preferably makes the switching frequency of the primary-side alternating-current voltage generating circuit constant, and controls an on-period proportion of a plurality of switching circuits to adjust an output power to be obtained from the secondary-side rectifier circuit, where a period during which current is conducted through the switching circuit is represented by an on period and a remaining period is represented by an off period.

The switching control circuit preferably changes the switching frequency of the primary-side alternating-current voltage generating circuit to control an on-period proportion of the switching elements so as to adjust an output power to be obtained from the secondary-side rectifier circuit.

Preferably, the secondary-side rectifier circuit stores the voltage generated in the secondary winding in the second resonant capacitor as electrostatic energy during the on periods or the off periods or during both the on periods and the off periods, adds voltages generated in the secondary winding during the respective on periods and off periods, and outputs the sum as a direct-current voltage.

Preferably, one or both of the first series resonant capacitor and the second series resonant capacitor holds a direct-current voltage.

Preferably, a parallel resonant capacitor is provided in parallel to the primary winding or the secondary winding.

Preferably, the parallel resonant capacitor is defined by a stray capacitance of the primary winding or the secondary winding.

Preferably, the mutual capacitance is defined by stray capacitance generated between the primary winding and the secondary winding.

Preferably, the first series resonant inductor or the second series resonant inductor is defined by a leakage inductance of the electromagnetic field coupling circuit.

Preferably, the mutual inductance is defined by magnetizing inductance equivalently generated between the primary winding and the secondary winding.

Preferably, the switching circuits are MOSFETs, for example.

Preferably, a rectifying element that is included in the secondary-side rectifier circuit and that rectifies the alternating-current voltage into a direct-current voltage is a MOSFET, for example.

Preferably, when power is transmitted from an output unit of the secondary-side rectifier circuit, the secondary-side rectifier circuit operates as the primary-side alternating-current voltage generating circuit and the primary-side alternating-current voltage generating circuit operates as the secondary-side rectifier circuit, and two-way power transmission is possible.

The primary winding preferably is a winding disposed on a primary side of a transformer including a magnetic core, and the secondary winding is a winding disposed on a secondary side of the transformer.

The primary winding preferably is a power transmission coil disposed in a power transmission device, and the secondary winding is a power reception coil disposed in a power reception device arranged to face the power transmission device.

According to various preferred embodiments of the present invention, an LC resonant circuit is disposed on each of the primary side and secondary side. The two LC resonant circuits are caused to resonate with each other, so that power transmission can be performed by utilizing magnetic field and electric field coupling between the primary winding and the secondary winding. In addition, with the resonance phenomenon allows only the real power to be transmitted from the primary side to the secondary side while the reactive power circulates in the LC resonant circuits on both the primary side and the secondary side, resulting in very small power loss. Furthermore, as to the switching frequency, switching elements in an overall multi-resonant circuit in which a primary-side resonant circuit and a secondary-side resonant circuit, which include an electromagnetic field coupling circuit, are combined are turned on and off at a frequency higher than a specific resonant frequency thereof at which the input impedance becomes minimum, thus enabling the switching element to perform a zero voltage switching (ZVS) operation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 2:
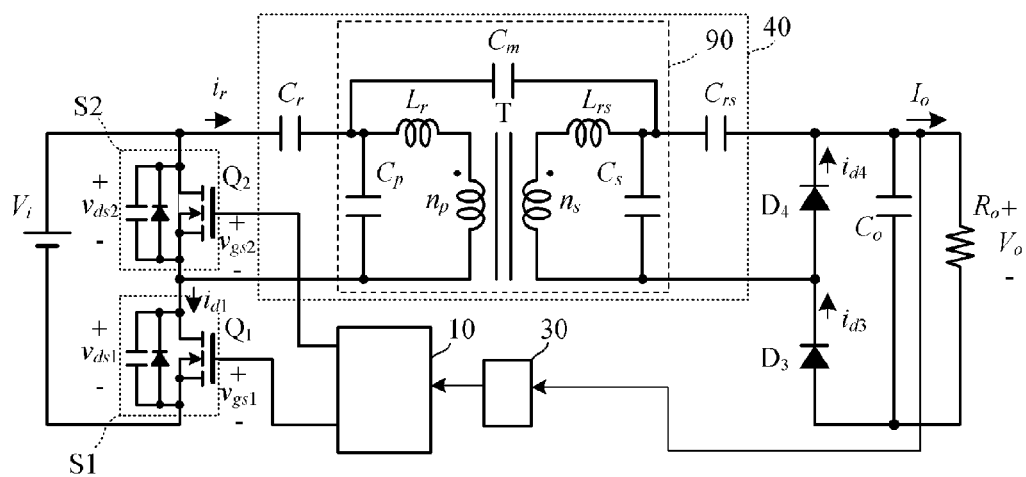
FIG. 2 is a circuit diagram of a switching power supply device 101 according to a first preferred embodiment of the present invention.

FIG. 2 is a circuit diagram of a switching power supply device 101 according to a first preferred embodiment of the present invention.

The switching power supply device 101 is a circuit including an input unit to which an input power supply Vi is input, and an output unit from which stable direct-current power is supplied to a load Ro. The switching power supply device 101 includes the units described below.

An electromagnetic field coupling circuit 90 includes a transformer including a primary winding np and a secondary winding ns.

A switching circuit S1 including a switching element Q1, and a switching circuit S2 including a switching element Q2, which are connected to the primary winding np, are also provided.

Rectifier diodes D3 and D4 and a smoothing capacitor Co, which are connected to the secondary winding ns, are provided.

A first LC series resonant circuit is connected to the primary winding np and defined by a series resonant inductor Lr and a series resonant capacitor Cr.

A second LC series resonant circuit is connected to the secondary winding ns and defined by a series resonant inductor Lrs and a series resonant capacitor Crs.

A multi-resonant circuit 40 includes the electromagnetic field coupling circuit 90 and is constituted by a first LC series resonant circuit and a second LC series resonant circuit.

A switching control circuit 10 is connected to the switching elements Q1 and Q2.

An insulation circuit 30 feeds back a detection signal of an output voltage to be output to the load Ro to the switching control circuit 10.

A parallel resonant capacitor Cp is connected in parallel to the primary winding np.

A parallel resonant capacitor Cs is connected in parallel to the secondary winding ns.

A mutual capacitance Cm is connected between the primary winding np and the secondary winding ns.

The electromagnetic field coupling circuit defines a electromagnetic field coupling circuit (electromagnetic field resonant circuit) in which magnetic field coupling and electric field coupling are merged together. The series resonant capacitors Cr and Crs also define capacitors that hold a direct-current voltage.

On the primary side, the capacitor Cr is charged during a conduction period of the switching element Q1, and the capacitor Cr is discharged during a conduction period of the switching element Q2. On the secondary side, the capacitor Crs is discharged during the conduction period of the switching element Q1, and the capacitor Crs is charged with a voltage generated in the secondary winding ns as electrostatic energy during the conduction period of the switching element Q2. The voltages at the secondary winding ns generated during the conduction periods of the switching elements Q1 and Q2 are added, and the sum is output. A circuit including the rectifier diodes D3 and D4 and the capacitor Crs defines an adder-rectifier circuit 80 that performs charging/discharging and rectification.

Note that an inductor Lm on the primary side may be an inductor serving as a component or may be a representation of a magnetizing inductance of the primary winding np of the transformer T. Similarly, the primary-secondary capacitance Cm may be a capacitance serving as a component or may be a representation of mutual capacitance that is a stray capacitance of the transformer T.

In FIG. 2, a portion surrounded by a thick broken line defines the electromagnetic field coupling circuit 90, and a portion surrounded by a thin broken line defines the multi-resonant circuit 40. In the multi-resonant circuit 40, which includes the electromagnetic field coupling circuit 90, the two LC resonant circuits on the primary side and the secondary side perform a resonant operation.

A non-limiting example of a specific operation of a preferred embodiment of the present invention is described below.

The first resonant circuit including Lr-Cr and the second resonant circuit including Lrs-Crs resonate with each other to cause sympathetic vibration of each resonant circuit, and two types of coupling, specifically, magnetic field coupling produced by mutual inductance and electric field coupling produced by mutual capacitance between the primary winding np and the secondary winding ns, are utilized to perform power transmission. Note that, in FIG. 2, the magnetizing inductance of the transformer T is utilized as mutual inductance (Lm) and no circuit element is illustrated.

The capacitors Cp and Cs accelerate power transmission based on electromagnetic field coupling. That is, the capacitors Cp and Cs and the mutual capacitance Cm define a power transmission circuit based on π-type electric field coupling, to transmit power. The mutual capacitance Cm also defines, together with the resonant capacitors Cr and Crs, a power transmission circuit based on electric field coupling.

Further, the capacitors Cp and Cs divide the resonant current ir flowing through the resonant capacitor Cr to a flow of current into a parallel capacitor of the switching circuit (a capacitor connected in parallel to the switching elements Q1 and Q2) and a flow of current into the capacitor Cp on the primary side in a commutation period during which the switching elements are turned off. As the resonant current ir increases, the current flowing through the capacitor Cp increases, making the current flowing through the parallel capacitance of the switching circuit during the commutation period substantially constant. By appropriately setting the capacitance of the capacitor Cp, it is possible to correct for the difference between the dead time period and the commutation period with respect to variation of the output power. Also on the secondary side, as the resonant current on the secondary side increases, the current flowing through the capacitor Cs increases. By appropriately setting the capacitance of the capacitor Cs, it is possible to correct for the difference between the dead time period and a period during which the current path is switched between the diode D3 and the diode D4 with respect to variation of the output power.

The switching elements Q1 and Q2 are alternately turned on and off with a dead time so as to shape the direct-current voltage Vi into a voltage waveform of a square or trapezoidal wave shape. The rectifier diodes D3 and D4 are alternately brought into a conductive state so as to shape the voltage waveform of a square or trapezoidal wave shape into a direct-current voltage.

The two resonant circuits on the primary side and secondary side resonate with each other at a switching frequency fs of the switching elements Q1 and Q2. The multi-resonant circuit 40 is constituted by the two resonant circuits on the primary side and secondary side, which include the electromagnetic field coupling circuit 90. The multi-resonant circuit 40 has a specific resonant frequency fr at which the synthetic impedance of the multi-resonant circuit 40 becomes minimum. The switching frequency fs and the resonant frequency fr approach and resonate so as to increase the currents flowing through the two resonant circuits and increasing the output power. That is, the switching elements are turned on and off at a switching frequency fs higher than the specific resonant frequency fr of the overall multi-resonant circuit 40 in which the primary-side resonant circuit and the secondary-side resonant circuit, which include the electromagnetic field coupling circuit, are combined, and the switching frequency fs approaches and resonates with the specific resonant frequency fr, so as to increase the current that flows into the multi-resonant circuit and increase the output power.

In contrast, in the case of operation with the switching frequency fs fixed, the output power increases as an on-period ratio Da that is the proportion of the conduction periods of the two switching circuits approaches Da=1, that is, as an on-period proportion D of the converter, which is the proportion of the conduction period of the first switching circuit S1 in one switching period, approaches D=0.5.

The capacitors Cr and Crs on the primary side and the secondary side serve two functions, namely, the operation of holding a direct-current voltage and the resonant operation.

The electromagnetic field coupling circuit 90 in FIG. 2 may be constituted by parasitic components of the transformer T, such as the magnetizing inductance Lm of the primary winding np of the transformer T, a magnetizing inductance Lms of the secondary winding ns, the series resonant inductors Lr and Lrs, and the capacitors Cp and Cs. In this case, the transformer can be referred to as a complex resonant transformer in which the function of a transformer capable of electrical insulation and electrical parameters such as those of resonant inductors and resonant capacitors are integrated, and can be used as an electromagnetic field coupling device.

Figure 3:
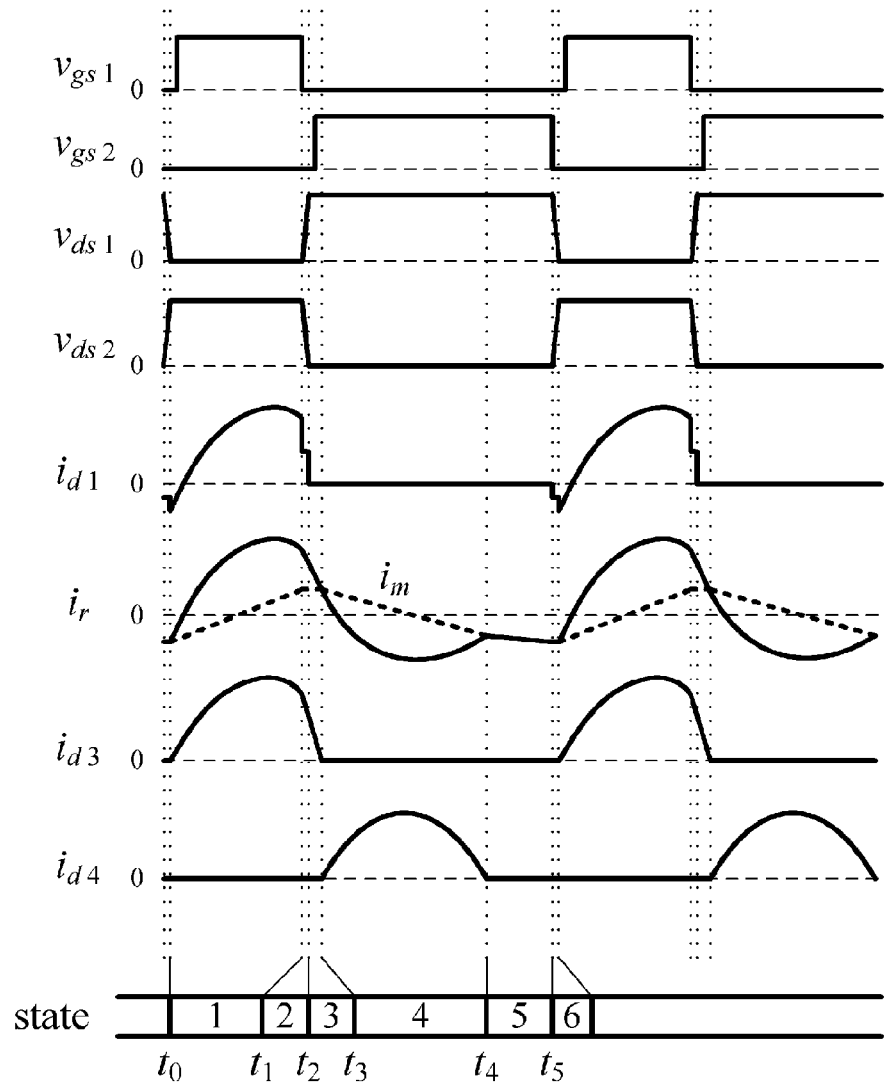
FIG. 3 is a waveform diagram of the voltages and currents of the individual units of the switching power supply device 101 illustrated in FIG. 2.

FIG. 3 is a waveform diagram of the voltages and currents of the individual units of the switching power supply device 101 illustrated in FIG. 2. The operations of the switching power supply device 101 at individual timings are as follows.

The magnetizing inductance and magnetizing current of the primary winding np of the transformer T are represented by Lm and im, respectively. The gate-source voltages of the switching elements Q1 and Q2 are represented by vgs1 and vgs2, respectively, the drain-source voltages thereof are represented by vds1 and vds2, respectively, and the drain current of the Q1 is represented by id1. The Q1 and Q2 are alternately turned on and off with a short dead time during which both switching elements are turned off, and commutate the currents flowing through the Q1 and Q2 during the dead time period to perform a zero voltage switching (ZVS) operation. The operations in individual states during one switching period will be given below.

[1] State 1: time t0 to time t1

The switching element Q1 is brought into a conductive state, a current flows through the winding np, and the capacitor Cr is charged. The diode D3 is brought into a conductive state, and a voltage is induced in the winding ns by the voltage applied to the winding np. The voltage induced in the winding ns and the voltage across the capacitor Crs are added, and a voltage is applied to the load. The capacitor Crs is discharged, and a current is supplied. When the switching element Q1 is turned off, State 2 occurs.

[2] State 2: time t1 to t2

The parallel capacitor (parasitic capacitance) of the switching element Q1 is charged by the current it flowing through the inductor Lr, and the parallel capacitor (parasitic capacitance) of the switching element Q2 is discharged. When the voltage vds1 becomes equal to the voltage Vi and the voltage vds2 becomes equal to 0 V, State 3 occurs.

[3] State 3: time t2 to time t3

The parallel diode of the switching element Q2 is brought into a conductive state. In this period, the switching element Q2 is turned off and consequently a ZVS operation is performed. When the current flowing through the diode D3 becomes equal to 0 A, State 4 occurs.

[4] State 4: time t3 to time t4

The switching element Q2 is brought into a conductive state, a current flows through the winding np, and the capacitor Cr is discharged. The diode D4 is brought into a conductive state, a voltage is induced in the winding ns by the voltage applied to the winding np, and the capacitor Crs is charged. The voltage at the capacitor Co is applied to the load, and a current is supplied. In this way, the current ir flowing through the inductor Lr is formed into a sinusoidal resonant current waveform. When the current flowing through the diode D4 becomes equal to 0, State 5 occurs.

[5] State 5: time t4 to time t5

On the primary side, the magnetizing current im of the transformer flows and becomes equal to the current ir. On the secondary side, the voltage at the capacitor Co is applied to the load, and a current is supplied. When the Q2 is turned off, State 6 occurs.

[6] State 6: time t5 to time t0

The parallel capacitor (parasitic capacitance) of the switching element Q1 is discharged by the current ir flowing through the inductor Lr, and the parallel capacitor (parasitic capacitance) of the switching element Q2 is charged. When the voltage vds1 becomes equal to 0 V and the voltage vds2 becomes equal to a voltage of Vi, State 1 occurs.

Thereafter, States 1 to 6 are repeated periodically.

The switching control circuit 10 performs the following control.

For the overall multi-resonant circuit in which the primary-side resonant circuit and the secondary-side resonant circuit, which include an electromagnetic field coupling circuit, are combined, the switching frequency is increased compared to the specific resonant frequency fr at which the input impedance becomes minimum. Accordingly, the multi-resonant circuit becomes inductive at that switching frequency. This enables the phase of the current flowing through the inductor Lr to be delayed with respect to the voltage phase of the alternating-current voltage of a square wave (trapezoidal wave) shape generated by the primary-side alternating-current voltage generating circuit. Thus, the switching element Q1 can be turned on with the voltage Vds1 of the switching element Q1 being 0. Similarly, the switching element Q2 can be turned on with the voltage vds2 of the switching element Q2 being 0. That is, a ZVS (zero voltage switching) operation is performed, thus enabling a significant reduction in switching loss and high-efficiency operation. In addition, because of operation performed at a switching frequency higher than the resonant frequency fr within an entire load range, a zero voltage switching (ZVS) operation can be implemented over the entire load range.

The switching frequency of the primary-side alternating-current voltage generating circuit is made constant, and the proportion of the conduction periods of the switching circuit including the switching element Q1 and the switching circuit including the switching element Q2, that is, the on-period ratio, is controlled to adjust the output power to be obtained from the secondary-side rectifier circuit.

Alternatively, the on-period ratio of the switching elements Q1 and Q2 is set to 1, and the switching elements Q1 and Q2 are controlled so that the switching frequency of the primary-side alternating-current voltage generating circuit is changed, so as to adjust the output power obtained from the secondary-side rectifier circuit.

Furthermore, the on-period ratio control and the switching frequency control described above are combined to perform control so that optimum control characteristics can be obtained, thereby adjusting the output power obtained from the secondary-side rectifier circuit.

According to the first preferred embodiment, the following advantages are achieved.

An electromagnetic field coupling circuit (electromagnetic field resonant circuit) in which magnetic field coupling and electric field coupling are merged together is provided by using resonance on the primary side and the secondary side, so as to provide higher power transmission efficiency than that in a case where power transmission is performed only by using magnetic field coupling, and enabling high-efficiency operation.

For the overall multi-resonant circuit in which the primary-side resonant circuit and the secondary-side resonant circuit, which include an electromagnetic field coupling circuit, are combined, the switching frequency is set higher than the specific resonant frequency fr at which the input impedance becomes minimum, so as to allow a ZVS (zero voltage switching) operation to be performed in the manner described above, thus enabling a significant reduction in switching loss and high-efficiency operation.

The secondary winding voltages generated during the on periods and the off periods of the switching elements on the primary side are added and the sum is output as a direct-current voltage, so as to enable a stable output voltage with on-period ratio control (PWM control) at a constant switching frequency.

The secondary winding voltages generated during the on periods and the off periods of the switching elements on the primary side are added and the sum is output as a direct-current voltage, so as to reduce the voltage to be applied to the rectifier to half that in the case of a center-tap rectifier and reducing loss.

An electromagnetic field coupling circuit is defined using a leakage inductance, a magnetizing inductance, a stray capacitance, a mutual capacitance, and the like of the transformer. Therefore, a converter can be constructed using a small number of components, and compact and lightweight design can be achieved.

The capacitors Cr and Crs on the primary side and the secondary side play two roles, namely, the operation of holding a direct-current voltage and the resonant operation, so as to convert a direct-current voltage into an alternating-current voltage while, and to perform a resonant operation as resonant capacitance that forms a multi-resonant circuit. Therefore, the number of components can be reduced. In addition, on-period ratio control (PWM control) at a constant switching frequency can be performed.

The capacitors Cp and Cs define, together with the mutual capacitance, a power transmission circuit based on π-type electric field coupling, and accelerate power transmission based on electromagnetic field coupling. Furthermore, by appropriately setting the capacitances Cp and Cs, it is possible to correct for the difference between the dead time period and the commutation period with respect to variation of the output power.

Second Preferred Embodiment

Figure 4:
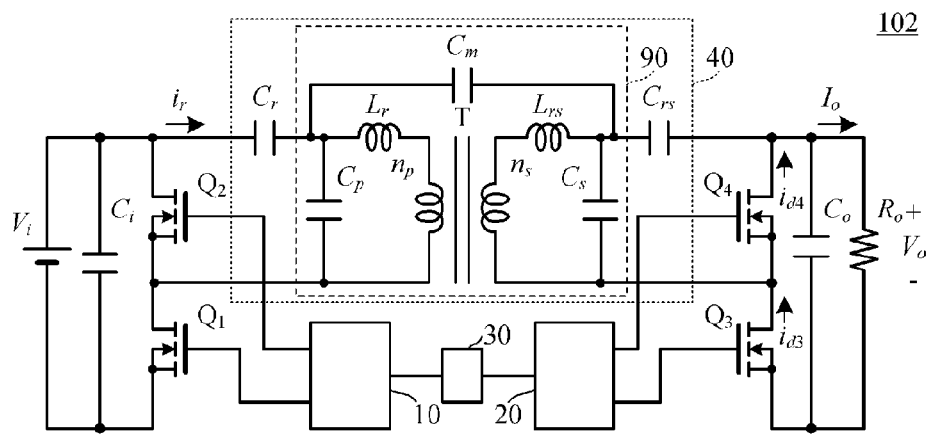
FIG. 4 is a circuit diagram of a switching power supply device 102 according to a second preferred embodiment of the present invention.

FIG. 4 is a circuit diagram of a switching power supply device 102 according to a second preferred embodiment of the present invention. In this example, unlike the switching power supply device 101 according to the first preferred embodiment, FET-type switching elements Q3 and Q4 are preferably disposed instead of the rectifier diodes D3 and D4 on the secondary side. That is, the switching elements Q3 and Q4 define a secondary-side rectifier circuit. The switching elements Q3 and Q4 each include a diode (parasitic diode) and a capacitor (parasitic capacitance) in parallel, and constitute switching circuits S3 and S4, respectively. In addition, a capacitor Ci is disposed in a power supply input unit. A switching control circuit 20 controls the switching elements Q3 and Q4 on the secondary side.

The magnetizing inductances Lm and Lms of the primary winding np and the secondary winding ns of the transformer T, and the parasitic capacitances and parasitic diodes of the switching elements Q1, Q2, Q3, and Q4 are not illustrated.

The switching control circuit 20 on the secondary side turns on and off the switching element Q3 in synchronization with the switching element Q1 on the primary side, and turns on and off the switching element Q4 in synchronization with the switching element Q2 on the primary side. That is, the switching control circuit 20 performs synchronous rectification. The overall operation of the switching power supply device 102 is similar to that of the switching power supply device 101 illustrated in the first preferred embodiment.

Figure 1:
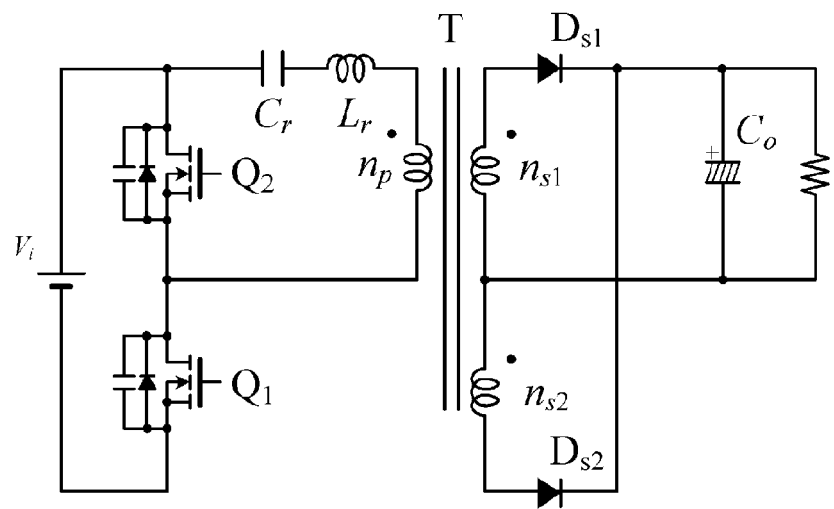
FIG. 1 is a basic circuit diagram of a switching power supply device in Japanese Unexamined Patent Application Publication No. 9-308243.
Figure 5A:
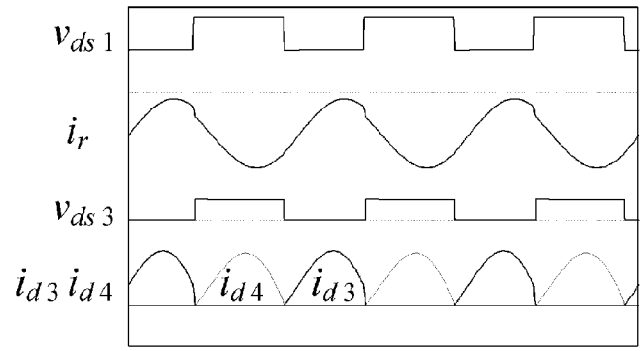
FIG. 5A is a waveform diagram of the voltages and currents of the individual units of the switching power supply device 102.
Figure 5B:
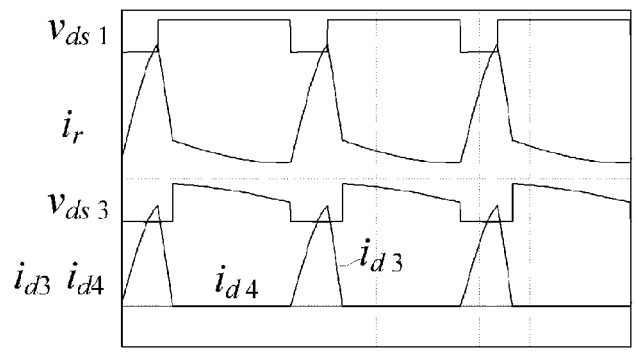
FIG. 5B is a waveform diagram of the voltages and currents of the individual units of the switching power supply device illustrated in FIG. 1.

FIG. 5A is a waveform diagram of the voltages and currents of the individual units of the switching power supply device 102. FIG. 5B is a waveform diagram of the voltages and currents of the individual units of the switching power supply device illustrated in FIG. 1. Here, vds1 represents the drain-source voltage of the switching element Q1, it represents the current flowing through the capacitor Cr, Vd3 represents the voltage across the switching element Q3, id3 represents the current flowing through the switching element Q3, and id4 represents the current flowing through the switching element Q4.

As the difference between FIG. 5A and FIG. 5B can be seen, in the existing method for center-tap rectification, a current flows through only one of two rectifier diodes, resulting in an unstable operation. A peak value of the current flowing through the rectifier diode and an effective current value increase, resulting in an increase in conduction loss. In the switching power supply device according to the second preferred embodiment, furthermore, the voltages applied to the switching elements Q3 and Q4 on the secondary side are substantially equal to the output voltage, whereas, in the existing method for center-tap rectification, it is found that a voltage that is twice as large as the output voltage is applied. According to the second preferred embodiment, a rectifying element with a small withstand voltage can be used by reducing voltage stress. In general, a diode element with a small withstand voltage has a small forward voltage drop, and a FET with a small withstand voltage has a small on-resistance. Thus, conduction loss caused by the flow of current can be reduced, enabling high-efficiency operation.

As can be seen in FIG. 4, the switching power supply device 102 according to the second preferred embodiment has a symmetric topology between the input and output. Thus, when power is transmitted from the output unit of the secondary-side rectifier circuit, the secondary-side rectifier circuit operates as a primary-side alternating-current voltage generating circuit, and the primary-side alternating-current voltage generating circuit defined by the switching elements Q1 and Q2 operates as a secondary-side rectifier circuit. This enables two-way power transmission from the primary side to the secondary side and from the secondary side to the primary side of the transformer T.

For example, in a case where the load Ro is a rechargeable battery or an accumulation capacitance or is a circuit including its charge/discharge control circuit, power is transmitted from the primary side to the secondary side of the transformer T, so as to allow the rechargeable battery to be charged. When a load circuit is connected to a portion to which the input power supply Vi is connected in FIG. 4, the rechargeable battery or the accumulation capacitance can be used as an input power supply, and the direction of power transmission can be reversed, enabling power transmission from secondary side to the primary side of the transformer T.

According to the second preferred embodiment, in addition to the advantages described above in the first preferred embodiment, the following advantages are achieved.

The FET-type switching elements Q3 and Q4 perform a synchronous rectification operation so as to reduce the forward drop voltage and reducing conduction loss in the rectifier circuit.

The operation of a two-way converter that transmits power in a reverse direction in which the primary side and the secondary side are interchanged can be performed.

Third Preferred Embodiment

Figure 6:
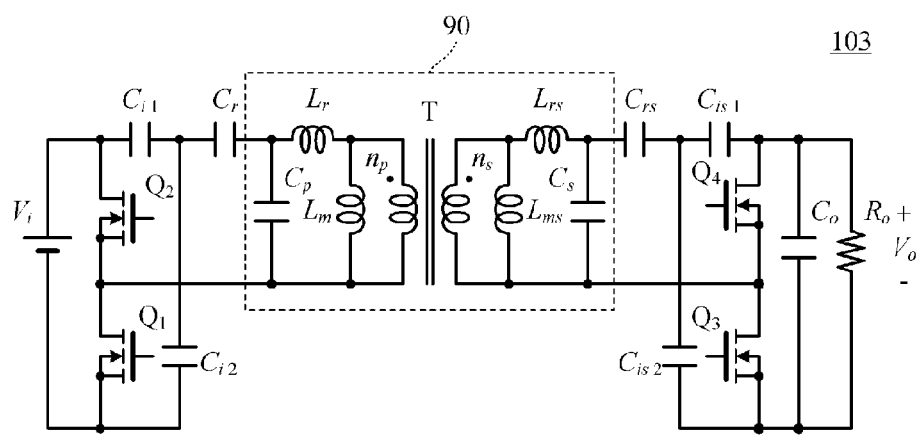
FIG. 6 is a circuit diagram of a switching power supply device 103 according to a third preferred embodiment of the present invention.

FIG. 6 is a circuit diagram of a switching power supply device 103 according to a third preferred embodiment. In this example, capacitors Ci1 and Ci2 that divide the voltage at the input power supply Vi, and capacitors Cis1 and Cis2 that divide the output voltage Vo are provided. Here, the inductors Lm and Lms, which are the magnetizing inductances of the primary winding np and the secondary winding ns of the transformer T or external inductances, are illustrated. The other components are similar to those in the second preferred embodiment illustrated in FIG. 4.

In the third preferred embodiment, the input voltage Vi is divided by the capacitors Ci1 and Ci2, and the output voltage Vo is divided by the capacitors Cis1 and Cis2. Since the capacitors Ci1 and Cis1 divide a direct-current input voltage, the capacitors Ci1 and Cis1 serve to hold a direct-current voltage. Thus, the series resonant capacitors Cr and Crs operate as capacitors for resonance, and do not serve to hold a direct-current voltage, that is, do not serve to bias the direct-current voltage component and perform a resonant operation. The overall converter operation is as given in the first preferred embodiment.

According to the third preferred embodiment, in addition to the advantages described above in the first and second preferred embodiments, the following advantages are achieved.

The input power supply Vi is divided into voltages at the capacitors Ci1 and Ci2, and a current flows from the input power supply Vi to the capacitors Ci1 and Ci2 in both cycles during which the switching elements Q1 and Q2 are turned on and off. The effective value of the input current flowing from the input power supply Vi is reduced, and conduction loss caused in the current paths is reduced.

Similarly to the advantage described above, the output voltage Vo is divided into voltages at the capacitors Cis1 and Cis2. The effective value of the current flowing from the capacitors Cis1 and Cis2 to the output voltage Vo in both cycles during which the switching elements Q1 and Q2 are turned on and off is reduced, and conduction loss is reduced.

Fourth Preferred Embodiment

Figure 7:
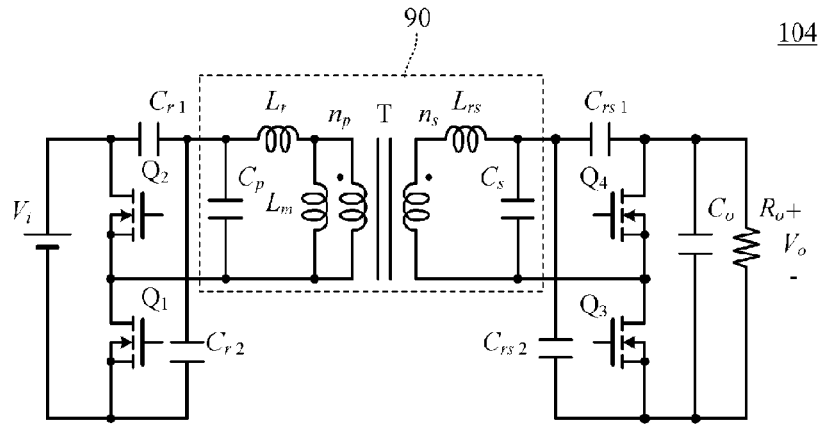
FIG. 7 is a circuit diagram of a switching power supply device 104 according to a fourth preferred embodiment of the present invention.

FIG. 7 is a circuit diagram of a switching power supply device 104 according to a fourth preferred embodiment. In this example, capacitors Cr1 and Cr2 that divide the voltage at the input power supply Vi, and capacitors Crs1 and Crs2 that divide the output voltage Vo are provided. That is, the series resonant capacitor Cr in the switching power supply device illustrated in the second preferred embodiment is divided into Cr1 and Cr2, and the series resonant capacitor Crs is divided into Crs1 and Crs2. Here, an equivalent mutual inductance Lm generated between the primary winding np and the secondary winding ns of the transformer T is illustrated, and the transformer T including the primary winding np and the secondary winding ns is illustrated as an ideal transformer. In a case where the transformer T is configured as an ideal transformer, the inductor Lr, the inductor Lrs, and the capacitors Cp and Cs can be formed as independent circuit elements. In addition, the electromagnetic field coupling circuit 90 itself can be provided by an independent complex resonant transformer by using a parasitic element of the transformer T. The other components are similar to those in the second preferred embodiment illustrated in FIG. 4.

In the fourth preferred embodiment, the current flowing through a series resonant capacitor is divided into two flows into two capacitors. Thus, the loss caused in the capacitor can be dispersed to reduce the overall loss, and generated heat is dissipated.

Note that the capacitors Cr1 and Cr2 and the capacitors Crs1 and Crs2 serve to hold a direct-current voltage and also serve as capacitors for series resonance.

Fifth Preferred Embodiment

Figure 8:
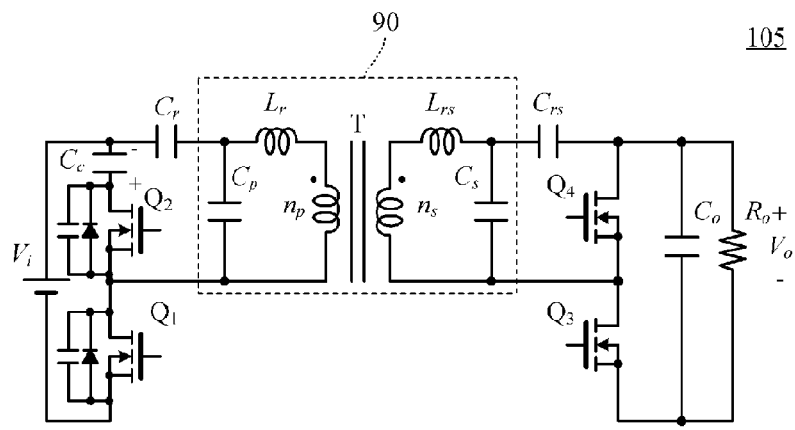
FIG. 8 is a circuit diagram of a switching power supply device 105 according to a fifth preferred embodiment of the present invention.

FIG. 8 is a circuit diagram of a switching power supply device 105 according to a fifth preferred embodiment. In this example, a capacitor Cc is disposed on the primary side so as to define a voltage clamp circuit. The other components are similar to those in the second preferred embodiment illustrated in FIG. 4.

In the switching power supply device illustrated in FIG. 8, after the switching element Q1 is turned off, the voltage at the primary winding np is charged in the capacitor Cc via a parasitic diode of the switching element Q2, that is, the voltage in the direction illustrated in FIG. 8 is charged. While the switching element Q2 is turned on, the voltage (+Vc) charged in the capacitor Cc is applied to a multi-resonant circuit. That is, the input voltage Vi is converted into a square-wave voltage, and the square-wave voltage has a voltage amplitude between +Vi and −Vc.

Figure 9:
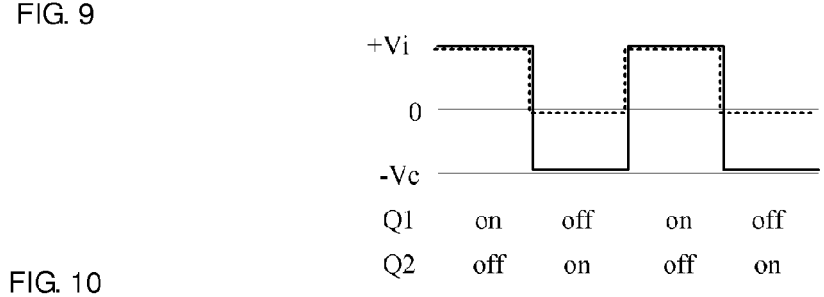
FIG. 9 illustrates the waveforms of a voltage input to a series resonant capacitor Cr illustrated in FIG. 8.

FIG. 9 illustrates the waveform of the voltage applied to a multi-resonant circuit including the series resonant capacitor Cr, the electromagnetic field coupling circuit 90, and the series resonant capacitor Crs illustrated in FIG. 8. Here, the solid line indicates the waveform in the case of the fifth preferred embodiment, and the broken line indicates the waveform in the case of the first to fourth preferred embodiments. In this manner, in the first to fourth preferred embodiments, the input power supply voltage to the resonant circuit changes between +Vi and 0 V and has a voltage amplitude Vi, whereas, in the fifth preferred embodiment, the input power supply voltage largely changes from +Vi to −Vc and operates with a voltage amplitude (Vi+Vc). In addition, the voltage Vc across the capacitor Cc included in the voltage clamp circuit changes in accordance with the on-period proportion D, which is the proportion of the conduction period of the switching element Q1 in a switching period, and the output voltage Vo can be controlled over a wide range. This means that when the output voltage is constant, application to changes in input power supply voltage over a wide range is excellent. With the voltage clamp circuit configured in the manner described above, the control characteristics with respect to variation of the input voltage can be improved. That is, even if the input voltage largely varies, a stable output voltage can be achieved.

Figure 10:
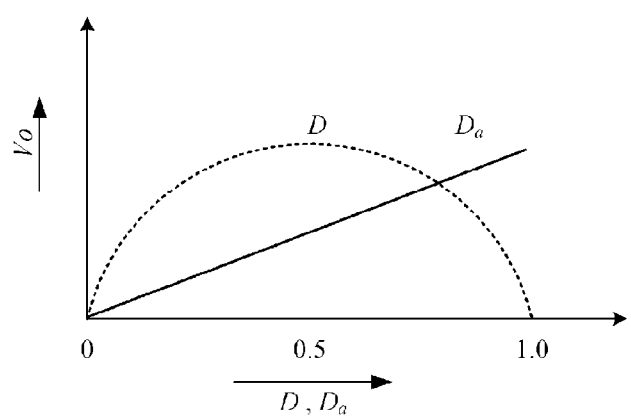
FIG. 10 is a diagram illustrating a relationship of an on-time proportion D that is the proportion of a conduction period of a switching circuit S1 in a switching period and an on-period proportion Da that is the proportion of a conduction period of a switching circuit S2 to the conduction period of the switching circuit S1 with respect to an output voltage Vo. Here, the solid line indicates characteristic curve of the on-period proportion Da, and the broken line indicates the characteristic curve of the on-time proportion D.

FIG. 10 is a diagram illustrating a relationship of the on-time proportion D, which is the proportion of the conduction period of the switching circuit S1 in a switching period, and the on-period proportion Da, which is the proportion of the conduction period of the switching circuit S2 to the conduction period of the switching circuit S1, with respect to the output voltage Vo. Here, the solid line indicates the characteristic curve of the on-period proportion Da, and the broken line indicates the characteristic curve of the on-time proportion D. In this manner, the output voltage is maximum when the on-period proportion Da is Da=1 and when the on-time proportion D is D=0.5.

Sixth Preferred Embodiment

Figure 11:
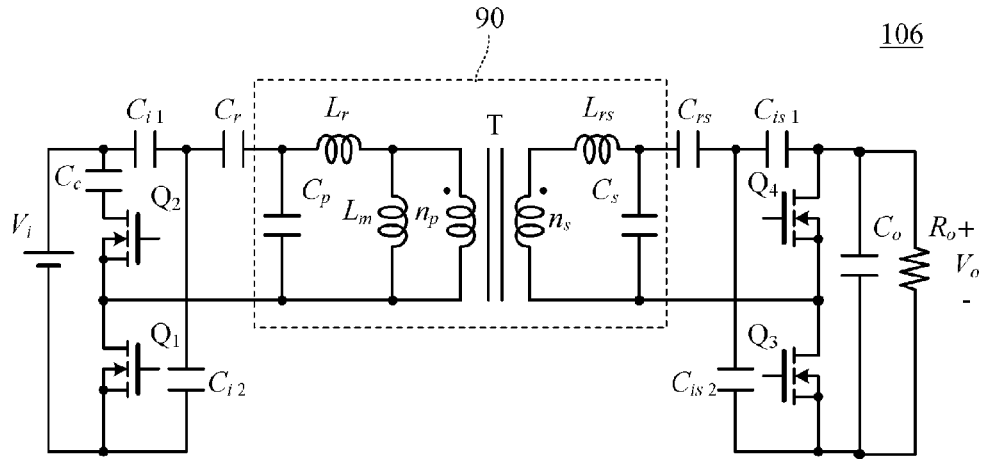
FIG. 11 is a circuit diagram of a switching power supply device 106 according to a sixth preferred embodiment of the present invention.

FIG. 11 is a circuit diagram of a switching power supply device 106 according to a sixth preferred embodiment. In this example, a capacitor Cc is disposed on the primary side to define a voltage clamp circuit. In addition, capacitors Ci1 and Ci2 that divide the voltage at the input power supply Vi, and capacitors Cis1 and Cis2 that divide the output voltage Vo are provided. Furthermore, the magnetizing inductance of the primary winding np is expressed as a circuit parameter. Here, an equivalent mutual inductance Lm generated between the primary winding np and the secondary winding ns of the transformer T is illustrated, and the transformer T including the primary winding np and the secondary winding ns is illustrated as an ideal transformer. In a case where the transformer T is configured as an ideal transformer, the inductor Lr, the inductor Lrs, and the capacitors Cp and Cs can be provided as independent circuit elements. In addition, the electromagnetic field coupling circuit 90 itself can be provided by an independent complex resonant transformer by using a parasitic element of the transformer T. The other components are similar to those in the second preferred embodiment illustrated in FIG. 4.

According to the sixth preferred embodiment, since the input power supply voltage operates with a large voltage amplitude from +Vi to −Vc, the control characteristics with respect to variation of the input voltage can be improved. In addition, since the input power supply Vi is divided into the voltages at the capacitors Ci1 and Ci2, a current flows from the input power supply Vi to the capacitors Ci1 and Ci2 in both cycles during which the switching elements Q1 and Q2 are turned on and off. The effective value of the input current is reduced, and conduction loss caused in the current paths in the current paths is reduced. Furthermore, also for the current flowing to the capacitors Cis1 and Cis2, the current effective value is reduced by the output voltage Vo, and conduction loss is reduced.

Seventh Preferred Embodiment

Figure 12:
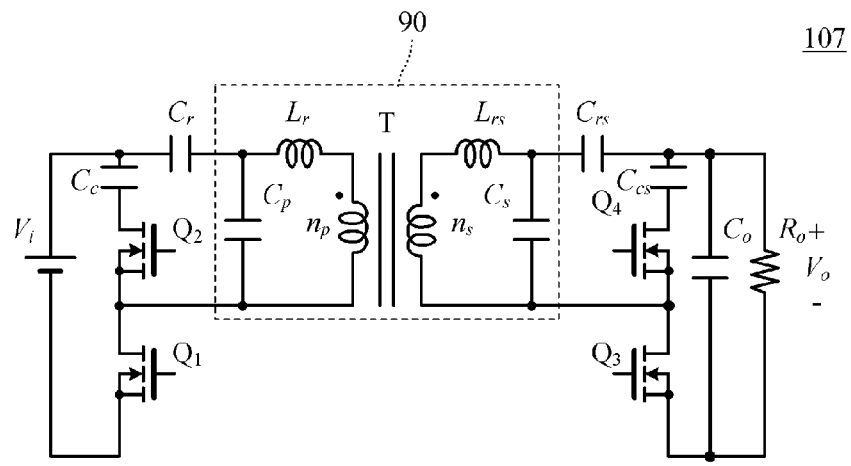
FIG. 12 is a circuit diagram of a switching power supply device 107 according to a seventh preferred embodiment of the present invention.

FIG. 12 is a circuit diagram of a switching power supply device 107 according to a seventh preferred embodiment. In this example, a capacitor Cc is disposed on the primary side to define a voltage clamp circuit on the primary side, and further a capacitor Ccs is disposed on the secondary side to define a voltage clamp circuit on the secondary side. The other components are similar to those in the fifth preferred embodiment illustrated in FIG. 7.

In the switching power supply device illustrated in FIG. 12, the input voltage Vi is converted into a square-wave voltage, and the square-wave voltage has a voltage amplitude between +Vi and −Vc. In addition, since a negative voltage (Vcs) is charged in the capacitor Ccs on the secondary side, an alternating-current square-wave voltage to be applied to a synchronous rectifier circuit defined by the switching elements Q3 and Q4 has a voltage amplitude between +Vo and −Vcs. In this manner, since the voltage amplitude is large, the control characteristics with respect to variation of the output voltage can also be improved. That is, the output voltage can be easily adjusted over a wide range.

Eighth Preferred Embodiment

Figure 13:
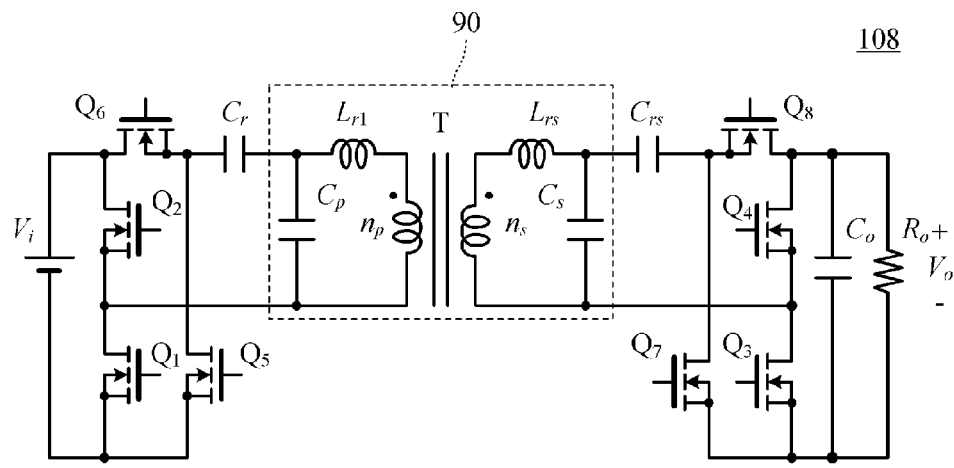
FIG. 13 is a circuit diagram of a switching power supply device 108 according to an eighth preferred embodiment of the present invention.

FIG. 13 is a circuit diagram of a switching power supply device 108 according to an eighth preferred embodiment. In this example, a primary-side alternating-current voltage generating circuit having a full-bridge circuit configuration defined by four switching elements Q1, Q2, Q5, and Q6 is provided. A secondary-side rectifier circuit having a bridge rectifier configuration defined by four switching elements Q3, Q4, Q7, and Q8 is further provided.

According to the eighth preferred embodiment, the voltages to be applied to the switching elements Q1, Q2, Q5, and Q6 on the primary side and the switching elements Q3, Q4, Q7, and Q8 on the secondary side are reduced to half compared to the first to seventh preferred embodiments, so as to reduce the loss caused in the switching elements.

Ninth Preferred Embodiment

Figure 14:
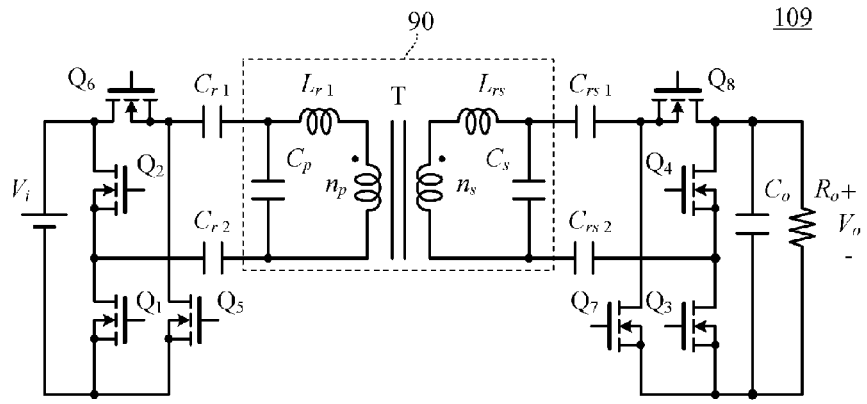
FIG. 14 is a circuit diagram of a switching power supply device 109 according to a ninth preferred embodiment of the present invention.

FIG. 14 is a circuit diagram of a switching power supply device 109 according to a ninth preferred embodiment. In this example, a resonant capacitor on the primary side is arranged to be divided into two capacitors Cr1 and Cr2, and a resonant capacitor on the secondary side is arranged to be divided into two capacitors Crs1 and Crs2. In addition, a primary-side alternating-current voltage generating circuit having a full-bridge circuit configuration defined by four switching elements Q1, Q2, Q5, and Q6 is provided. A secondary-side rectifier circuit having a bridge rectifier configuration defined by four switching elements Q3, Q4, Q7, and Q8 is further provided.

According to the ninth preferred embodiment, since the voltage to be applied to each of the resonant capacitors Cr and Crs illustrated in the first to third preferred embodiments and the like is divided and applied to two capacitors, the loss caused in the capacitors can be dispersed. In addition, the voltages to be applied to the switching elements Q1, Q2, Q5, and Q6 on the primary side and the switching elements Q3, Q4, Q7, and Q8 on the secondary side are each reduced to half, so as to reduce the loss caused in the switching element.

Note that the capacitors Cr1 and Cr2 and the capacitors Crs1 and Crs2 serve to hold a direct-current voltage and also serve as capacitors for series resonance.

Tenth Preferred Embodiment

The foregoing preferred embodiments have been described in the context of a switching power supply device including a transformer as a component and used as a DC-DC converter, by way of example. The following preferred embodiments will be described in the context of a device that performs power transmission between opposing devices in an electrically non-contact manner, by way of example.

Figure 15:
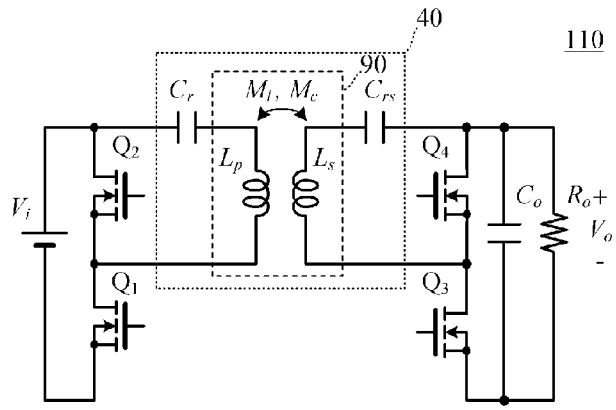
FIG. 15 is a circuit diagram of a switching power supply device 110 according to a tenth preferred embodiment of the present invention.

FIG. 15 is a circuit diagram of a switching power supply device 110 according to a tenth preferred embodiment. In FIG. 15, Lp denotes a power transmission coil on the power transmission device side, and Ls denotes a power reception coil on the power reception device side.

In this example, the inductor Lr illustrated in the first to ninth preferred embodiments is preferably defined by an equivalent leakage inductor of the power transmission coil Lp, and the capacitor Cp illustrated in the first to ninth preferred embodiments is preferably defined by an equivalent parallel capacitor between the windings of the power transmission coil Lp. In addition, the inductor Lrs illustrated in the first to ninth preferred embodiments is preferably defined by an equivalent leakage inductor of the power reception coil Ls, and the capacitor Cs illustrated in the first to ninth preferred embodiments is preferably defined by an equivalent parallel capacitor between the windings of the power reception coil Ls. Furthermore, an equivalent inductance involved in magnetic field in the coupling power transmission coil Lp is generated as the mutual inductance Lm, and an equivalent capacitance involved in electric field coupling between the power transmission coil Lp and the power reception coil Ls is generated as the mutual capacitance Cm.

A parameter Ml illustrated in FIG. 15 denotes the mutual coefficient of magnetic field coupling, and Mc denotes the mutual coefficient of electric field coupling. A mutual coefficient M for electromagnetic field coupling is provided by combining magnetic field coupling (mutual coefficient Ml) based on the mutual inductance and electric field coupling (mutual coefficient Mc) based on the mutual capacitance.

As can be seen in FIG. 15, the switching power supply device 110 used as a power transmission system has a symmetric topology between the input and the output. Thus, when power is transmitted from the output unit of the secondary-side rectifier circuit, the secondary-side rectifier circuit operates as a primary-side alternating-current voltage generating circuit, and the primary-side alternating-current voltage generating circuit defined by the switching elements Q1 and Q2 operates as a secondary-side rectifier circuit. This also enables power transmission with the relationship between power transmission and power reception exchanged.

For example, in a case where the load Ro is a rechargeable battery or an accumulation capacitance or is a circuit including its charge/discharge control circuit, power is transmitted from the power transmission coil Lp to the power reception coil Ls, so as to allow the rechargeable battery to be charged. When a load circuit is connected to a portion to which the input power supply Vi is connected in FIG. 15, the rechargeable battery or the accumulation capacitance is used as an input power supply, and power is transmitted from the power reception coil Ls to the power transmission coil Lp.

According to the tenth preferred embodiment, the following advantages are achieved.

A considerably simple power transmission system can be provided.

A power transmission coil and a power reception coil are arranged spaced away from each other, so as to provide a wireless power transmission circuit system.

A two-way power transmission circuit system can be provided by replacing the transmission side and the reception side.

Eleventh Preferred Embodiment

Figure 16:
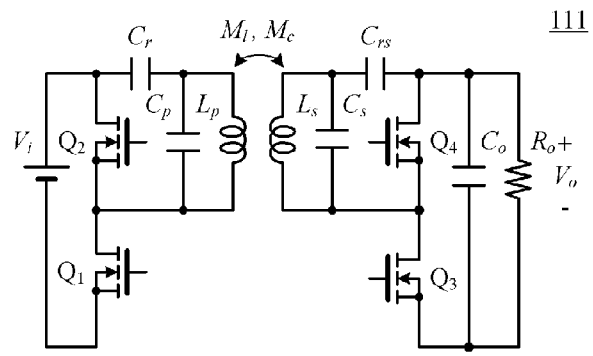
FIG. 16 is a circuit diagram of a switching power supply device 111 used as an electric power transmission system according to an eleventh preferred embodiment of the present invention.

FIG. 16 is a circuit diagram of a switching power supply device 111 used as an electric power transmission system according to an eleventh preferred embodiment.

Unlike the circuit according to the tenth preferred embodiment illustrated in FIG. 15, a parallel capacitor Cp is disposed on the power transmission device side, and a parallel capacitor Cs is disposed on the power reception device side. In this manner, the parallel capacitors Cp and Cs serving as components are provided, so as to allow arbitrary setting of a desired resonant frequency on the power transmission device side and a desired resonant frequency on the power reception device side. Therefore, optimization can be easily performed.

Twelfth Preferred Embodiment

Figure 17:
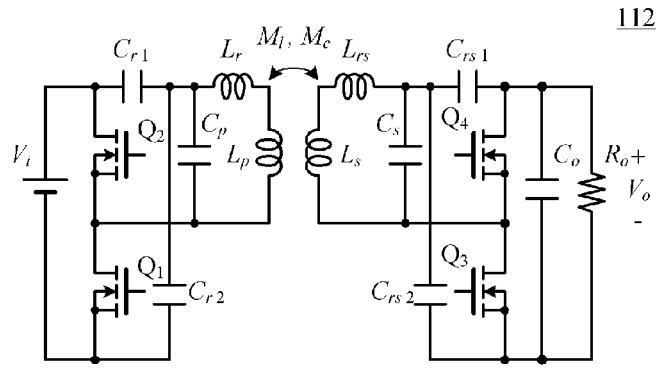
FIG. 17 is a circuit diagram of a switching power supply device 112 used as an electric power transmission system according to a twelfth preferred embodiment of the present invention.

FIG. 17 is a circuit diagram of a switching power supply device 112 used as an electric power transmission system according to a twelfth preferred embodiment.

Unlike the circuit according to the tenth preferred embodiment illustrated in FIG. 15, the resonant capacitor Cr is configured to be divided into resonant capacitors Cr1 and Cr2, and the resonant capacitor Crs is configured to be divided into resonant capacitors Crs1 and Crs2, by way of example. With this configuration, the current flowing through each of the capacitors Cr and Crs is divided into two flows into two capacitors. Thus, the loss caused in the capacitors can be dispersed, and generated heat is also dissipated.

Note that the capacitors Cr1 and Cr2 and the capacitors Crs1 and Crs2 serve to hold a direct-current voltage and also serve as capacitors for series resonance.

Thirteenth Preferred Embodiment

Figure 18:
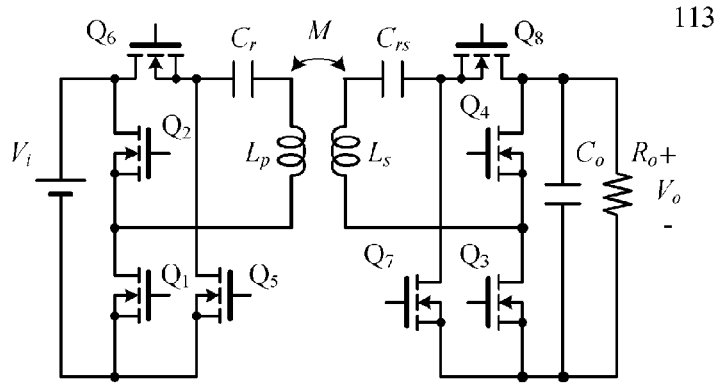
FIG. 18 is a circuit diagram of a switching power supply device 113 used as an electric power transmission system according to a thirteenth preferred embodiment of the present invention.

FIG. 18 is a circuit diagram of a switching power supply device 113 used as an electric power transmission system according to a thirteenth preferred embodiment. In this example, an alternating-current voltage generating circuit on the power transmission device side is constituted by a full-bridge circuit defined by four switching elements Q1, Q2, Q5, and Q6. In addition, a rectifier circuit on the power reception device side is constituted by a bridge rectifier circuit defined by four switching elements Q3, Q4, Q7, and Q8. A parameter M illustrated in FIG. 18 denotes the mutual coefficient of electromagnetic field coupling provided by combining magnetic field coupling based on mutual inductance and electric field coupling based on mutual capacitance.

According to the thirteenth preferred embodiment, the voltages to be applied to the switching elements Q1, Q2, Q5, and Q6 on the power transmission device side and the switching elements Q3, Q4, Q7, and Q8 on the power reception device side are reduced to half compared to the tenth to twelfth preferred embodiments, so as to reduce the loss caused in the switching elements.

Fourteenth Preferred Embodiment

Figure 19:
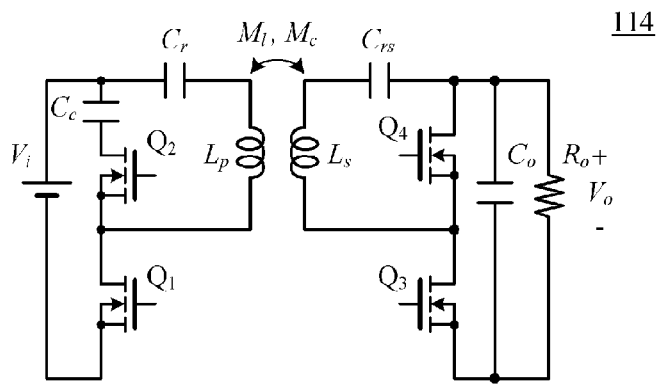
FIG. 19 is a circuit diagram of a switching power supply device 114 used as an electric power transmission system according to a fourteenth preferred embodiment of the present invention.

FIG. 19 is a circuit diagram of a switching power supply device 114 used as an electric power transmission system according to a fourteenth preferred embodiment. In this example, a capacitor Cc is disposed on the power transmission device side to define a voltage clamp circuit. The other components are similar to those in the tenth preferred embodiment illustrated in FIG. 15.

According to the fourteenth preferred embodiment, if the negative voltage changed in the capacitor Cc is represented by −Vc, the square-wave voltage generated on the power transmission device side has a voltage amplitude between +Vi and −Vc, so as to improve the control characteristics with respect to variation of the transmission direct-current voltage.

Fifteenth Preferred Embodiment

Figure 20:
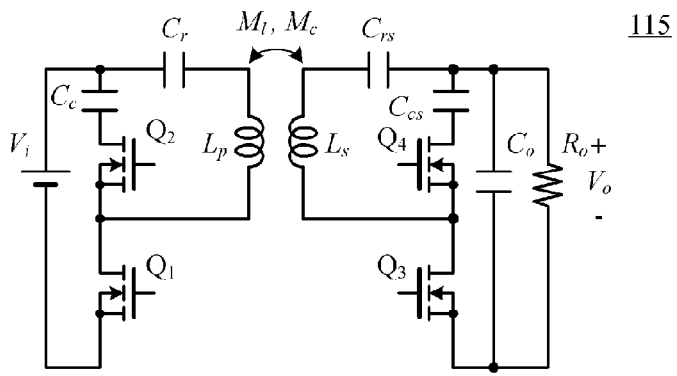
FIG. 20 is a circuit diagram of a switching power supply device 115 used as an electric power transmission system according to a fifteenth preferred embodiment of the present invention.

FIG. 20 is a circuit diagram of a switching power supply device 115 used as an electric power transmission system according to a fifteenth preferred embodiment. In this example, a capacitor Ccs is disposed on the power reception device side to also define a voltage clamp circuit on the secondary side. The other components are similar to those in the fourteenth preferred embodiment illustrated in FIG. 19.

In this example, the input voltage Vi is converted into a square-wave voltage on the power transmission device side, and the square-wave voltage has a voltage amplitude between +Vi and −Vc. In addition, since a negative voltage (Vcs) is charged in the capacitor Ccs on the power reception device side, an alternating-current square-wave voltage to be applied to a synchronous rectifier circuit defined by the switching elements Q3 and Q4 has a voltage amplitude between +Vo and −Vcs. In this manner, since the voltage amplitude is large, the control characteristics with respect to variation of the output voltage can also be improved. That is, the output voltage can be easily adjusted over a wide range.

Sixteenth Preferred Embodiment

Figure 21:
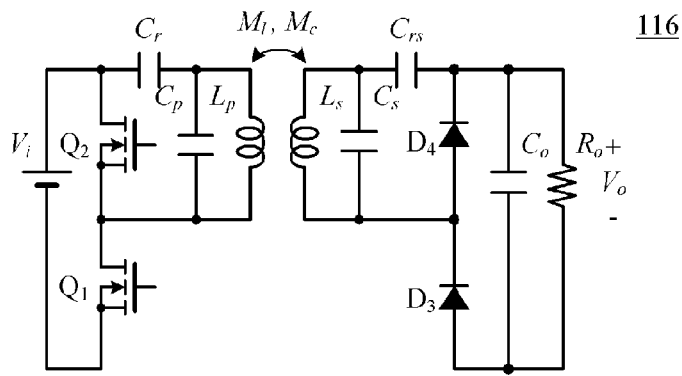
FIG. 21 is a circuit diagram of a switching power supply device 116 used as an electric power transmission system according to a sixteenth preferred embodiment of the present invention.

FIG. 21 is a circuit diagram of a switching power supply device 116 used as an electric power transmission system according to a sixteenth preferred embodiment. In this example, a rectifier circuit on the power reception device side is defined by rectifier diodes D3 and D4. With this configuration, a one-way power transmission system in which a power reception device has a simple configuration can be provided.

Seventeenth Preferred Embodiment

Figure 22:
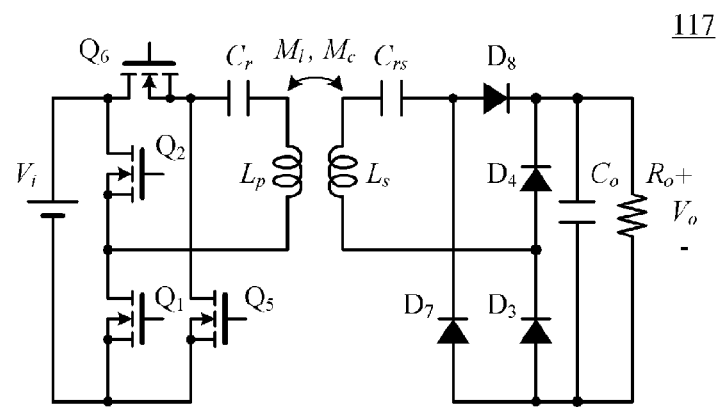
FIG. 22 is a circuit diagram of a switching power supply device 117 used as an electric power transmission system according to a seventeenth preferred embodiment of the present invention.

FIG. 22 is a circuit diagram of a switching power supply device 117 used as an electric power transmission system according to a seventeenth preferred embodiment. In this example, an alternating-current voltage generating circuit on the power transmission device side is constituted by a full-bridge circuit defined by four switching elements Q1, Q2, Q5, and Q6. In addition, a rectifier circuit on the power reception device side is constituted by a diode bridge defined by rectifier diodes D3, D4, D7, and D8.

According to the seventeenth preferred embodiment, a one-way power transmission system can be provided. In addition, the withstand voltage of the rectifier diodes can be reduced to half.

Eighteenth Preferred Embodiment

Figure 23:
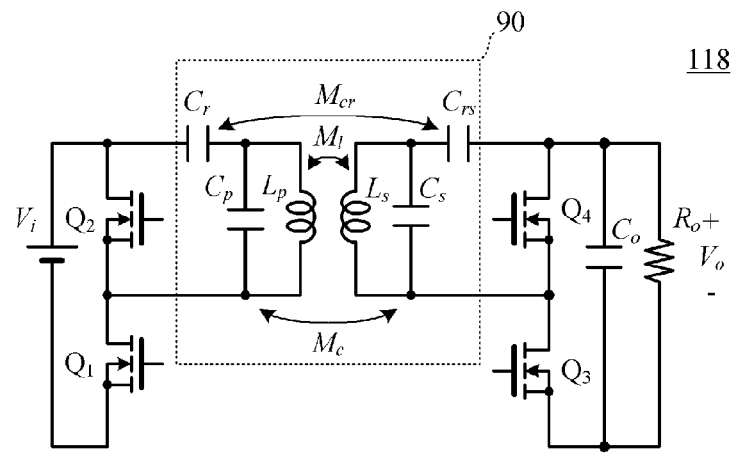
FIG. 23 is a circuit diagram of a switching power supply device 118 used as an electric power transmission system according to an eighteenth preferred embodiment of the present invention.

FIG. 23 is a circuit diagram of a switching power supply device 118 used as an electric power transmission system according to an eighteenth preferred embodiment. In this example, mutual inductance that produces magnetic field coupling between inductors Lp and Ls of a coil is represented by Ml, mutual capacitance that produces electric field coupling between capacitors Cp and Cs is represented by Mc, and mutual capacitance that produces electric field coupling between capacitors Cr and Crs is represented by Mcr. Here, an exemplary preferred embodiment in which an electromagnetic field coupling circuit 90 is configured to include capacitors Cr and Crs is illustrated.

According to the configuration of the eighteenth preferred embodiment, an electromagnetic field resonant circuit is provided by appropriately setting the mutual inductance Ml, the mutual capacitance Mc, and the mutual capacitance Mcr, and high-efficiency power transmission based on electromagnetic field coupling can be performed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply device comprising:
an electromagnetic field coupling circuit including a primary winding and a secondary winding;
  a primary-side alternating-current voltage generating circuit including switching circuits connected to the primary winding, each of the switching circuits including a parallel connection circuit which includes a switching element, a diode, and a capacitor, the primary-side alternating-current voltage generating circuit generating an alternating-current voltage from an input direct-current voltage;
  a secondary-side rectifier circuit that rectifies the alternating-current voltage into a direct-current voltage;
  a first resonant circuit on a primary side, the first resonant circuit including a first series resonant inductor and a first series resonant capacitor;
  a second resonant circuit on a secondary side, the second resonant circuit including a second series resonant inductor and a second series resonant capacitor; and
  a switching control circuit that alternately turns on and off the switching elements of the primary-side alternating-current voltage generating circuit with a dead time to generate an alternating-current voltage having a substantially square or trapezoidal wave shape; wherein
  the switching control circuit causes the switching elements of the primary-side alternating-current voltage generating circuit to perform a switching operation at a switching frequency higher than a specific resonant frequency at which impedance for a multi-resonant circuit becomes minimum, the multi-resonant circuit being a combination of the first resonant circuit and the second resonant circuit which includes the electromagnetic field coupling circuit, so that a current flowing into the multi-resonant circuit has a sinusoidal resonant current waveform that is delayed from the alternating-current voltage generated from the primary-side alternating-current voltage generating circuit and power is transmitted from the primary side to the secondary side through the electromagnetic field coupling circuit in both on periods and off periods of the switching elements;

the electromagnetic field coupling circuit defines an electromagnetic field resonant circuit in which magnetic field coupling through mutual inductance and electric field coupling through mutual capacitance are mixed between the primary winding and the secondary winding; and the first resonant circuit and the second resonant circuit resonate with each other to allow power to be transmitted from the primary side to the secondary side of the electromagnetic field coupling circuit.

2. The switching power supply device according to claim 1, wherein the switching control circuit makes the switching frequency of the primary-side alternating-current voltage generating circuit constant, and controls an on-period proportion of the switching circuits to adjust an output power to be obtained from the secondary-side rectifier circuit, where a period during which current is conducted through each of the switching circuits is represented by an on period and a remaining period is represented by an off period.

3. The switching power supply device according to claim 1, wherein the switching control circuit changes the switching frequency of the primary-side alternating-current voltage generating circuit to control an on-period proportion of the switching elements to adjust an output power to be obtained from the secondary-side rectifier circuit.

4. The switching power supply device according to claim 1, wherein the secondary-side rectifier circuit stores voltages generated in the secondary winding in the second series resonant capacitor as electrostatic energy during the on periods or the off periods or during both of the on periods and the off periods, adds voltages generated in the secondary winding during the respective on periods and off periods, and outputs a sum of the voltages as a direct-current voltage.

5. The switching power supply device according to claim 1, wherein one or both of the first series resonant capacitor and the second series resonant capacitor is arranged to hold a direct-current voltage.

6. The switching power supply device according to claim 1, wherein a parallel resonant capacitor is provided in parallel to the primary winding or the secondary winding.

7. The switching power supply device according to claim 6, wherein the parallel resonant capacitor is defined by a stray capacitance of the primary winding or the secondary winding.

8. The switching power supply device according to claim 1, wherein the mutual capacitance is defined by stray capacitance generated between the primary winding and the secondary winding.

9. The switching power supply device according to claim 1, wherein the first series resonant inductor or the second series resonant inductor is defined by a leakage inductance of the electromagnetic field coupling circuit.

10. The switching power supply device according to claim 1, wherein the mutual inductance is defined by magnetizing inductance equivalently generated between the primary winding and the secondary winding.

11. The switching power supply device according to claim 1, wherein the switching circuits are MOSFETs.

12. The switching power supply device according to claim 1, wherein a rectifying element that is included in the secondary-side rectifier circuit and that rectifies the alternating-current voltage into a direct-current voltage is a MOSFET.

13. The switching power supply device according to claim 12, wherein when power is transmitted from an output unit of the secondary-side rectifier circuit, the secondary-side rectifier circuit operates as the primary-side alternating-current voltage generating circuit and the primary-side alternating-current voltage generating circuit operates as the secondary-side rectifier circuit such that two-way power transmission occurs.

14. The switching power supply device according to claim 1, wherein the primary winding is a winding disposed on a primary side of a transformer including a magnetic core, and the secondary winding is a winding disposed on a secondary side of the transformer.

15. The switching power supply device according to claim 1, wherein the primary winding is a power transmission coil disposed in a power transmission device, and the secondary winding is a power reception coil disposed in a power reception device arranged to face the power transmission device.

16. The switching power supply device according to claim 1, wherein the diode of the parallel connection circuit is a rectifier diode and the capacitor of the parallel connection circuit is a smoothing capacitor.

17. The switching power supply device according to claim 1, further comprising an insulation circuit arranged to feed back a detection signal of an output voltage to be output from the switching power supply device to the switching control circuit.

18. The switching power supply device according to claim 1, wherein the secondary side rectifier circuit includes rectifier diodes.

19. The switching power supply device according to claim 1, wherein the secondary side rectifier circuit includes FET switching elements.

20. The switching power supply device according to claim 1, further comprising capacitors arranged to divide the input direct-current voltage, and capacitors arranged to divide an output voltage.

* * * * *